United States Patent Office 3,585,260
Patented June 15, 1971

3,585,260
CHROMIC ACID BONDED CHROMIC OXIDE AGGLOMERATES PRODUCED BY SPRAY DRYING
Kenneth Urmston Holker and Rosemary Green, Harrogate, England, assignors to Albright & Wilson Limited, Birmingham, England
No Drawing. Continuation-in-part of application Ser. No. 746,248, July 22, 1968. This application July 29, 1969, Ser. No. 845,898
Claims priority, application Great Britain, Aug. 1, 1967, 34,214/67; Dec. 11, 1968, 58,845/68
Int. Cl. C04b *35/12, 33/30*
U.S. Cl. 264—63                                             5 Claims

ABSTRACT OF THE DISCLOSURE

Granular chromium oxide suitable for producing uniform, high purity flame sprayed coatings is prepared by slurrying finely divided chromium oxide in aqueous chromic acid and forming the slurry into dried granules by spray drying which are further heated to convert the chromic acid to chromic oxide, either in a calciner or during the course of flame or plasma arc spraying.

---

This application is a continuation-in-part application of our co-pending application Ser. No. 746,248 filed July 22, 1968 and now abandoned.

The present invention provides improvements relating to chromic oxide, and in particular a method for obtaining chromic oxide in a granular state suitable for forming high purity coatings by flame-spraying or plasma arc techniques.

There are a number of uses and potential uses for chromic oxide which require a free-flowing granular material of high bulk density. For example, chromic oxide is used in flame and plasma sprayed coatings because of its chemical stability, hardness, etc.

A major factor in the formation of ceramic coatings by flame or plasma arc spraying techniques, is the physical nature of the powder sprayed. It is important that the powders be free-flowing to enable them to be fed easily through flame-spraying equipment, and it is preferable that they should lie within a very close particle size range to ensure uniformity of heating and fusion and hence a uniform coating of low porosity. The particle size ranges generally preferred are 150–300 B.S. mesh (105–53$\mu$) or 300–400 B.S. mesh (53–37$\mu$). It is also advantageous for the powder to be of relatively high bulk density to assist the formation of a uniform dense coating.

As normally produced, however, chromic oxide contains much material of less than one micron size and has a pronounced tendency to "ball" into agglomerates so that it is far from free-flowing and cannot be fed into flame-spraying equipment. Methods available at present for the preparation of granular chromic oxide, including chromic oxide in a form suitable for use in flame-spray and plasma arc applications, involve heating chromic oxide to a temperature of 1800–2000° C. for several hours to obtain crystals of the desired size and subsequently screening the product. Alternatively, suitable material may be obtained by heating chromic oxide until it melts, allowing the material to solidify and subsequently grinding and screening the product. The processes are clearly expensive and the use of the product has, therefore, been limited to a very few applications.

It is known that chromic oxide granules can be produced by spray-drying a slurry of chromic oxide in water. However, such granules have little mechanical strength and are usually of low density. They are, therefore, unsuitable for use in the application described above.

Although binders have been used to improve the mechanical strength of certain types of granule obtained by spray-drying techniques, their use necessarily introduces contaminants. For this reason they have not been considered satisfactory for the production of granular chromic oxide of high density which is also substantially free of contaminating materials. The latter point is important since contaminants may adversely modify the properties of the coating.

An object of the present invention is to provide a free-flowing granular chromic oxide having a particle size suitable for use in flame-spray applications, of a uniform high density and capable of forming chromic oxide coatings of high purity.

We have now discovered that chromic oxide having improved particle size and physical properties and suitable for use in flame-spraying, may be obtained by granulating (e.g. spray-drying) a slurry of chromic oxide in aqueous chromic acid. The granules may subsequently be heated, e.g. by calcination in a rotary kiln, to convert the chromic acid into chromic oxide. Alternatively, the acid bound granules may be used directly in a flame or plasma arc spray gun, and converted to pure chromic oxide coating by the heat of the gun.

Our invention, therefore, provides a method for the preparation of granular chromic oxide, which comprises forming a mixture of finely divided chromic oxide in aqueous chromic acid and forming the mixture into dried granules each comprising chromic oxide and chromic acid.

Preferably, the mixture is in the form of a pumpable slurry which is spray-dried to form the granules. The amount of chromic acid added can be varied depending on process conditions. If too high a quantity of chromic acid is added, the granules will be hygroscopic. Therefore, if it is desired to store the acid bound granules before use, or before the final heating stage, this can present problems due to the mass becoming "sticky" and agglomerating. However, where, for example, a spray-drier discharges directly into a suitable furnace there is no theoretical limit to the amount of chromic acid which can be incorporated in the slurry. However, where excessive quantities are used loss of chromium as volatile hexavalent chromium compounds occurs in the furnace. In order to minimise this, we prefer to use a weight of chromic acid no greater than the weight of chromic oxide in the slurry.

If it is desired to store or screen the material before the final heating stage and non-hygroscopic granules are required therefor, the amount of chromic acid added to the oxide slurry should be no greater than 7% by weight of the oxide in the slurry. Desirably, the mixture contains at least 0.5% of chromic acid by weight of chromic oxide and preferably at least 1% by weight.

The amount of water present in the initial mixture depends on the desired size of the granules and the method of granulation. It is, of course, desirable from the point of view of cost, to use as little water as possible consistent with obtaining as large a proportion of the product as possible in the desired size range. We have found, for example, that we can obtain products suitable for flame-spraying by spray-drying slurries containing from 30–70% of water by weight of the total slurry with adjustment of atomising conditions accordingly. For example we prefer to use an initial slurry containing 50–60% of water and to atomise this with a 10″ diameter inverted bowl centrifugal head operating at a speed of 4000–6000 r.p.m. Desirably the proportion of water and conditions of drying are chosen to provide a majority of granules between 150 and 400 mesh.

Various alternative methods of granulation may be employed using any of the known mechanical granulators to compact the chromic oxide/chromic acid mixture into pellets of a size and bulk density appropriate to any particular end use.

The chromic acid may be converted to chromic oxide by heating the granules to a temperature above the melting point of chromic acid for a sufficient time to convert at least the majority of the acid. Preferably, temperatures above 200° C., e.g. 300 to 600° C., are employed and calcination times of at least 30 mins.

The granules are preferably screened to obtain the desired size. Screening may occur before or after the granules are calcined, but is most conveniently performed after calcination. It is possible to include minor proportions of other ceramic materials, such as aluminium, zirconia or oxides of tungsten or magnesium, as well as carbides and silicides in the chromic oxide granules of our invention, if desired.

The invention is illustrated by the following examples:

EXAMPLE 1

A slurry of chromic oxide containing 45% solids and 2.5% chromic acid (based on weight of chromic oxide) was fed into a spray-drier through a nozzle atomiser. The fraction collected in the base dried was heated for 1 hour at 400° C. to decompose chromic acid and then screened to obtain particles of 150–300 mesh which were 25% of the total. The product consisted of robust granules which were free-flowing, of bulk density 1.48 g./cc. compared with 1.37 g./cc. of the original metallurgic chromic oxide, which in any case was not suitable because of its tendency to agglomerate.

EXAMPLE 2

A slurry of chromic oxide containing 45% solids and 5% chromic acid (based on weight of chromic oxide) was subjected to centrifugal atomisation in a spray-drier. The fraction collected in the base drier was heated for 1 hour at 400° C. to decompose chromic acid and then screened to obtain particles of 300–400 mesh which were 33% of the total. The bulk density of this free-flowing powder was 1.50 g./cc.

EXAMPLE 3

A slurry of chromic oxide containing 45% solids and 5% chromic acid (based on weight of chromic oxide) was atomised with a 10 in. diameter inverted bowl centrifugal head operating at a speed of 5700 r.p.m. The fraction collected in the chamber was heated for 2 hours at 600° C. to decompose the chromic acid and screened to obtain particles of 150–400 mesh which were 94% of the total. 80% of the product was in the range 150–300 mesh and 14% between 300 and 400 mesh.

What we claim is:

1. A method for the production of granular chromic oxide which comprises slurrying finely powdered chromic oxide with an aqueous solution of chromic acid in a proportion of 30 to 70% water based on the total weight of the slurry and from 0.5 to 7% of chromic acid based on the weight of chromic oxide to form a slurry consisting essentially of chromic oxide, chromic acid and water, and spray drying said slurry to form dried granules having a majority of particles between 150 and 400 mesh BSS.

2. A method according to claim 1 wherein the proportion of water in the slurry is from 50–60% by weight based on the proportion of chromic oxide.

3. A method according to claim 1 wherein the granules are further heated at a temperature of 300–600° C. for at least 30 mins.

4. A method according to claim 1 wherein the granules are subsequently sprayed onto a surface through a high temperature plasma above the fusion point of chromic oxide, whereby the chromic acid is decomposed and an essentially pure coating of chromic oxide is formed on the surface.

5. Granules having a particle size between 150 and 400 mesh BSS, each consisting of a powdered chromic oxide and, as binder therefor, from 0.5 to 7% by weight of chromic acid based on the weight of oxide.

References Cited

UNITED STATES PATENTS

| | | | |
|---|---|---|---|
| 2,272,039 | 2/1942 | Morgan | 106—57 |
| 3,259,171 | 7/1966 | Siemssen | 264—43 |
| 3,475,188 | 10/1969 | Woodhouse et al. | 106—66 |

OTHER REFERENCES

"Spray Drying Speeds Electronic Component Pressing," an article appearing in the March 1966 issue of Ceramic Age, pages 34–35.

P.W. Sherwood: "Ultra-High Temperature Spraying—To Coat Metals With Refractories," an article appearing in the February 1965 issue of Products Finishing, pages 54–56, 58, and 60.

W. D. Kingery (ed.): "Ceramic Fabrication Processes," Hans Thurnauer (author), 1958, John Wiley & Sons, Inc., New York, pages 65–66.

JULIUS FROME, Primary Examiner

J. H. MILLER, Assistant Examiner

U.S. Cl. X.R.

23—145; 106—66, 302; 117—46; 264—13